US008234870B2

(12) United States Patent
Gage

(10) Patent No.: US 8,234,870 B2
(45) Date of Patent: Aug. 7, 2012

(54) ADDITIVE INJECTION SYSTEM FOR IMPROVING THERMAL STABILITY OF JET FUEL

(75) Inventor: Marc E. Gage, Feeding Hills, MA (US)

(73) Assignee: Hamilton Sundstrand Corporation, Rockford, IL (US)

( * ) Notice: Subject to any disclaimer, the term of this patent is extended or adjusted under 35 U.S.C. 154(b) by 730 days.

(21) Appl. No.: 12/386,397

(22) Filed: Apr. 17, 2009

(65) Prior Publication Data
US 2010/0263348 A1 Oct. 21, 2010

(51) Int. Cl.
*F02C 1/00* (2006.01)
*F02C 3/00* (2006.01)
*F02C 7/08* (2006.01)
*F02C 7/22* (2006.01)
*F02C 7/26* (2006.01)

(52) U.S. Cl. ................ 60/734; 60/736; 60/776
(58) Field of Classification Search .......... 60/734, 60/736, 776, 39.281; 244/135 A
See application file for complete search history.

(56) References Cited

U.S. PATENT DOCUMENTS

| 3,179,291 A * | 4/1965 | Umbach et al. ........... 222/20 |
| 3,270,497 A * | 9/1966 | Malick ..................... 44/443 |
| 3,392,753 A * | 7/1968 | Kleinmann ............ 137/564.5 |
| 3,504,685 A * | 4/1970 | Kleinmann ................ 137/3 |
| 3,864,095 A | 2/1975 | Sinclair et al. |
| 4,321,905 A | 3/1982 | Kurasawa |
| 4,422,413 A | 12/1983 | Pederson |
| 5,469,830 A | 11/1995 | Gonzalez |
| 6,079,198 A * | 6/2000 | Prowse et al. ............. 60/776 |
| 6,415,595 B1 * | 7/2002 | Wilmot et al. ............. 60/785 |
| 6,609,534 B1 * | 8/2003 | Beaney et al. ........... 137/87.03 |
| 7,013,636 B2 * | 3/2006 | Iya et al. .................. 60/204 |
| 7,093,437 B2 * | 8/2006 | Spadaccini et al. ......... 60/734 |
| 7,389,753 B1 | 6/2008 | Lee |
| 7,438,840 B2 | 10/2008 | Ickinger |
| 2005/0223629 A1 * | 10/2005 | Sutkowski et al. ......... 44/397 |
| 2007/0082305 A1 * | 4/2007 | Chen et al. ............... 431/11 |
| 2007/0240649 A1 * | 10/2007 | Freeman ................. 123/1 A |
| 2008/0173003 A1 * | 7/2008 | Chen ........................ 60/39.12 |

OTHER PUBLICATIONS

Detail Specification: Turbine Fuel, Aviation, Kerosene Type, JP-8 (NATO F-34), NATO F-35, and JP-8+100 (NATO F-37); MIL-DTL-83133F, Apr. 11, 2008 (22 pages).
Engineering Directorate Technical Bulletin: Use of JP-8+100 Fuel Additive in USAF Weapon Systems; EN-AB-08-002, Aug. 12, 2008 (2 pages).
GE Infrastructure Water & Process Technologies Fact Sheet: SPEC•AID™ 8Q462 Jet Fuel High Temperature Stability & Detergent Additives (2 pages) (date unknown).

(Continued)

*Primary Examiner* — William H Rodriguez
*Assistant Examiner* — Carlos A Rivera
(74) *Attorney, Agent, or Firm* — Kinney & Lange, P.A.

(57) ABSTRACT

A gas turbine engine fuel system includes a fuel tank for storing fuel, a heat exchanger through which the fuel from the fuel tank can pass, a fuel pump located downstream from the heat exchanger for pumping the fuel, a fuel metering unit for metering the fuel pumped by the fuel pump, an additive tank for storing a fuel additive, an additive delivery subsystem for mixing the fuel additive with the fuel at or before the heat exchanger to generate a fuel and fuel additive mixture, and a combustor located downstream of the fuel metering unit where the fuel and fuel additive mixture is delivered for combustion. The fuel additive comprises a fuel stabilizer for reducing fuel coking.

20 Claims, 3 Drawing Sheets

OTHER PUBLICATIONS

GE Infrastructure Water & Process Technologies Fact Sheet: SPEC•AID™ 8Q462 Aviation Fuel Performance Additive (2 pages) (date unknown).

GE Infrastructure Water & Process Technologies Case History: JP-8+100 Program Maintenance Impact—Comparison Between Users & Non-Users (2 pages) (date unknown).

GE Infrastructure Water & Process Technologies Case History: JP-8+100 Program Background & Development History (2 pages) (date unknown).

Shell Aviation, "AeroShell Performance Additive 101", from http://shell.com/home/content/aviation-en/productservice/avat..., visited Mar. 18, 2009 (2 pages).

Coordinating Research Council, Inc., Handbook of Aviation Fuel Properties, CRC Report No. 635, 2004 Third Edition pp. 1-28, 1-29, 1-40, 1-41, and 2-48 (7 pages).

* cited by examiner

ADDITIVE INJECTION SYSTEM FOR IMPROVING THERMAL STABILITY OF JET FUEL

BACKGROUND

The present invention relates to fuel systems, and more particularly to fuel systems for gas turbine engines.

Gas turbine engines, such as those suitable for use with aircraft, generally use hydrocarbon-based fuels. The elevated temperatures at which prior art gas turbine engine fuel systems operate—up to approximately 121° C. (250° F.)—can cause chemical reactions to occur within the fuel that can lead to the formation and deposition of carbonaceous materials, which is referred to in the art as fuel "coking". These deposits can undesirably accumulate on fuel system components such as conduits, valve surfaces, filter screens, etc., and can lead to malfunctions and/or increased needs for repair or maintenance.

Gas turbine engines for military aircraft have utilized a pre-mixed fuel JP-8+100, which is a mixture of JP-8 fuel plus a fuel stabilizer. However, usage of such mixtures is limited by the availability of the pre-mixed fuel, which could limit the travel of an aircraft that requires such pre-mixed fuel. Thus, commercial applications of stabilized fuel mixtures are limited.

SUMMARY

A gas turbine engine fuel system according to the present invention includes a fuel tank for storing fuel, a heat exchanger through which the fuel from the fuel tank can pass, a fuel pump located downstream from the heat exchanger for pumping the fuel, a fuel metering unit for metering the fuel pumped by the fuel pump, an additive tank for storing a fuel additive, an additive delivery subsystem for mixing the fuel additive with the fuel at or before the heat exchanger to generate a fuel and fuel additive mixture, and a combustor located downstream of the fuel metering unit where the fuel and fuel additive mixture is delivered for combustion. The fuel additive comprises a fuel stabilizer for reducing fuel coking.

DETAILED DESCRIPTION

In general, the present invention provides a gas turbine engine fuel system that enables delivery and mixing of a fuel additive, such as a fuel stabilizer, to fuel for combustion. The fuel and additive mixture can allow fuel system operational temperatures of 135° C. (275° F.) or more, while reducing a risk of fuel coking. Embodiments of the present invention are configured to allow delivery and mixing of the additive to the fuel at or near a fuel metering unit (FMU). The present invention is suitable for use on an aircraft, or other gas turbine engine applications, and provides a relatively compact and lightweight system for mixing fuel and a fuel additive without a need for premixed fuel/additive mixtures.

Figure 1:
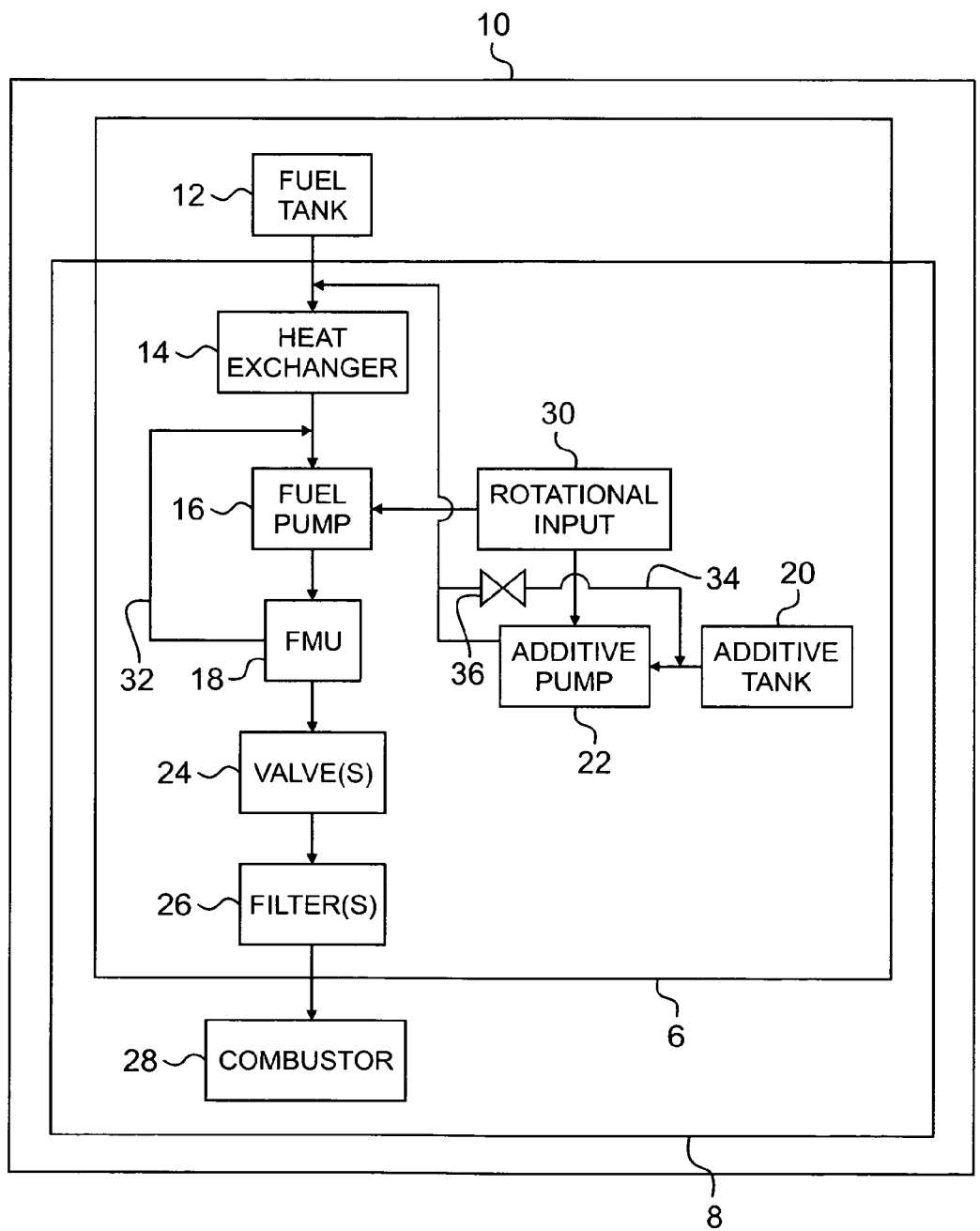
FIG. 1 is a block diagram of one embodiment of a fuel system according to the present invention.

FIG. 1 is a block diagram of a fuel system 6 for use with a gas turbine engine 8 of an aircraft 10. The fuel system 6 includes a fuel tank 12, a heat exchanger 14, a fuel pump 16, a fuel metering unit (FMU) 18, an additive tank 20, an additive pump 22, one or more valves 24, and one or more filters 26. The fuel system 6 has an output fluidically connected to a combustor 28 of the gas turbine engine 8 (for simplicity other components of the gas turbine engine 8 are not shown).

The fuel tank 12 provides for storage on the aircraft 10 of a suitable hydrocarbon-based gas turbine engine fuel, such as known fuel formulations like Jet A and Jet A-1 (defined by industry specification ASTM D 1655) or JP-8 (defined by military specification MIL-DTL-83133). Fuel from the tank 12 is delivered through the exchanger 14, which transfers thermal energy to the fuel. In one embodiment, the heat exchanger 14 is a fuel/oil heat exchanger for transferring thermal energy from oil to the fuel. In further embodiments, the heat exchanger 14 can be of another type. The heat exchanger 14 generally increases an operating temperature of the fuel, and portions of the fuel system 6 downstream from the heat exchanger 14 are generally referred to as the "hot section". In one embodiment, the fuel in the hot section has an operating temperature of at least approximately 135° C. (275° F.). Downstream from the heat exchanger 14 is the fuel pump 16, which is operable to pump the fuel from the tank 12 through the fuel system 6. The fuel pump 16 can be a positive displacement pump of a known configuration. The FMU 18 is located near the fuel pump 16 in the fuel system 6, and allows for controlled dosing of fuel delivered to the combustor 28. The FMU 18 can be of a known configuration. Fuel passing from the fuel tank 12 to the combustor 28 can pass through any number of the valves 24, the filters 26, and other known fuel system components before reaching the combustor 28. It should be understood that the illustrated embodiment of the fuel system 6 is provided merely by way of example, and additional components can be included as desired for particular applications. Moreover, the particular arrangement of components like the valves 24 and the filters 26 within the fuel system 6 can vary as desired for particular applications.

The additive tank 20 is carried on the aircraft 10, and can be relatively small compared to the fuel tank 12. A fuel stabilizing additive that helps increase fuel operating temperature capabilities and help reduce coking, such as Spec Aid™ 8Q462 (available from GE Water & Process Technologies, Trevose, Pa.) or AeroShell Performance Additive 101 (available from Shell Oil Co., Houston, Tex.), can be stored in the additive tank 20. In one embodiment, the fuel stabilizing additive is capable of increasing the fuel operating temperature by at least approximately 38° C. (100° F.) over that of the fuel without the additive while still maintaining a relatively low risk of fuel coking. In another embodiment, the fuel stabilizing additive is capable of increasing the fuel operating temperature to at least approximately 135° C. (275° F.). One advantage of having the additive tank 20 carried on the aircraft 10 is that the fuel tank 12 can be filled with widely-available types of fuel, such as Jet A, and a pre-mixed fuel and additive mixture is not required. This allows the aircraft 10 to fly to almost anywhere common fuels are available to refill the fuel tank 12, so long as a suitable amount of the fuel stabilizing additive is carried in the additive tank 20 for subsequent mixing on board the aircraft 10. Travel of the aircraft 10 is therefore generally not limited by availability of pre-mixed additive and fuel mixtures for refueling.

Additive from the additive tank 20 is distributed by the additive pump 22 for mixture with fuel from the fuel tank 12. The additive pump 22 is a positive displacement pump, and can be of a known configuration. Additive is delivered by the additive pump 22 to a location in the fuel system 6 that is at or before the heat exchanger 14. The additive can be mixed with the fuel substantially continuously during operation of the gas turbine engine 8 for delivery to the combustor 28. In one embodiment, the fuel/additive mixture includes approximately 0.03%, by weight, of the additive.

In the illustrated embodiment, the fuel pump 16 and the additive pump 22 are powered by a common rotational input 30, such as a common drive shaft. The gas turbine engine 8 can provide a rotational output to the shaft, which is engaged so as to drive both the fuel pump 16 and the additive pump 22. This configuration allows for continuous mixture of the fuel and the additive. In this way the common rotational input 30 can help control a ratio of additive to fuel in the resultant mixture. The FMU 18 and suitable recirculation lines can further help control mixing ratios of the fuel and the additive. For example, in the illustrated embodiment a first recirculation line 32 extends from the FMU 18 to a point upstream from the fuel pump 16, which allows fuel/additive mixture output dosages to the combustor 28 to be selectively controlled regardless of a speed of the rotational input 30. Furthermore, a second recirculation line 34 is provided with a suitable valve 36 that controls recirculation of the additive from the additive pump 22 to a location upstream of the additive pump 22 to selectively control dosage ratios of the additive regardless of a speed of the rotational input 30. The first and second recirculation lines 32 and 34 can thereby help coordinate outputs of the fuel pump 16 and the additive pump 22, in order to help ensure that the fuel/additive mixture maintains a desired ratio of additive to fuel while dosages of the resultant mixture to the combustor 28 are also controlled. The mixture of the fuel and the additive can then flow through other hot section components of the fuel system 6 to the combustor 28.

Figure 2:
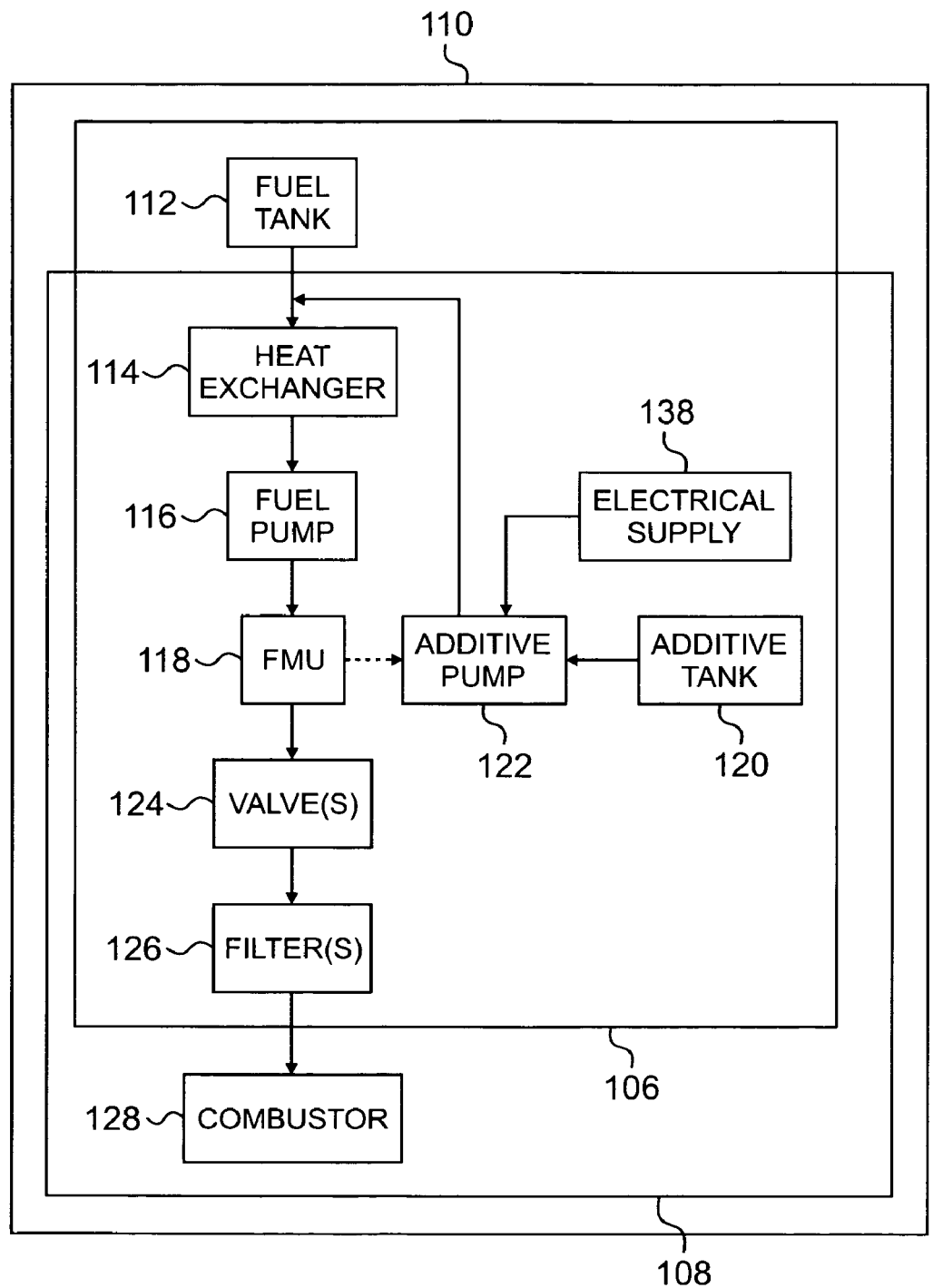
FIG. 2 is a block diagram of another embodiment of a fuel system according to the present invention.

FIG. 2 is a block diagram of another embodiment of a fuel system 106 for use with a gas turbine engine 108 of an aircraft 110. The fuel system 106 is generally similar to the fuel system 6 described above, and includes a fuel tank 112, a heat exchanger 144 (e.g., a fuel/oil heat exchanger), a fuel pump 116, a FMU 118, an additive tank 120, an additive pump 122, one or more valves 124, and one or more filters 126. The fuel system 106 delivers a fuel and additive mixture to a combustor 128 of the gas turbine engine 108. However, in the embodiment illustrated in FIG. 2, the additive pump 122 is an electrically-powered positive displacement pump powered by an electrical supply 138. The additive pump 122 can be of a known configuration. The electrical supply 138 can provide electricity from a generator associated with the gas turbine engine 108, or from another source. Furthermore, the additive pump 122 can be attached or otherwise integrated with the FMU 118 to deliver and mix the additive with the fuel at or near the location of the heat exchanger 114. Such a configuration can simplify assembly and installation of the fuel system 106. Moreover, by locating the additive pump 122 at the FMU 118, space on the aircraft 110 is conserved and need for special design of the aircraft 110 to accommodate the additive pump 122 and the additive tank 120 is reduced. In the illustrated embodiment, operation of the additive pump 122 is linked to operation of the fuel pump 116 by way of a signal from the FMU 118 to the additive pump 112. The signal is generated as a function of the fuel/additive mixture pumped by the fuel pump 116 and dosed by the FMU 118, and can be transmitted electrically or by other suitable means.

Figure 3:
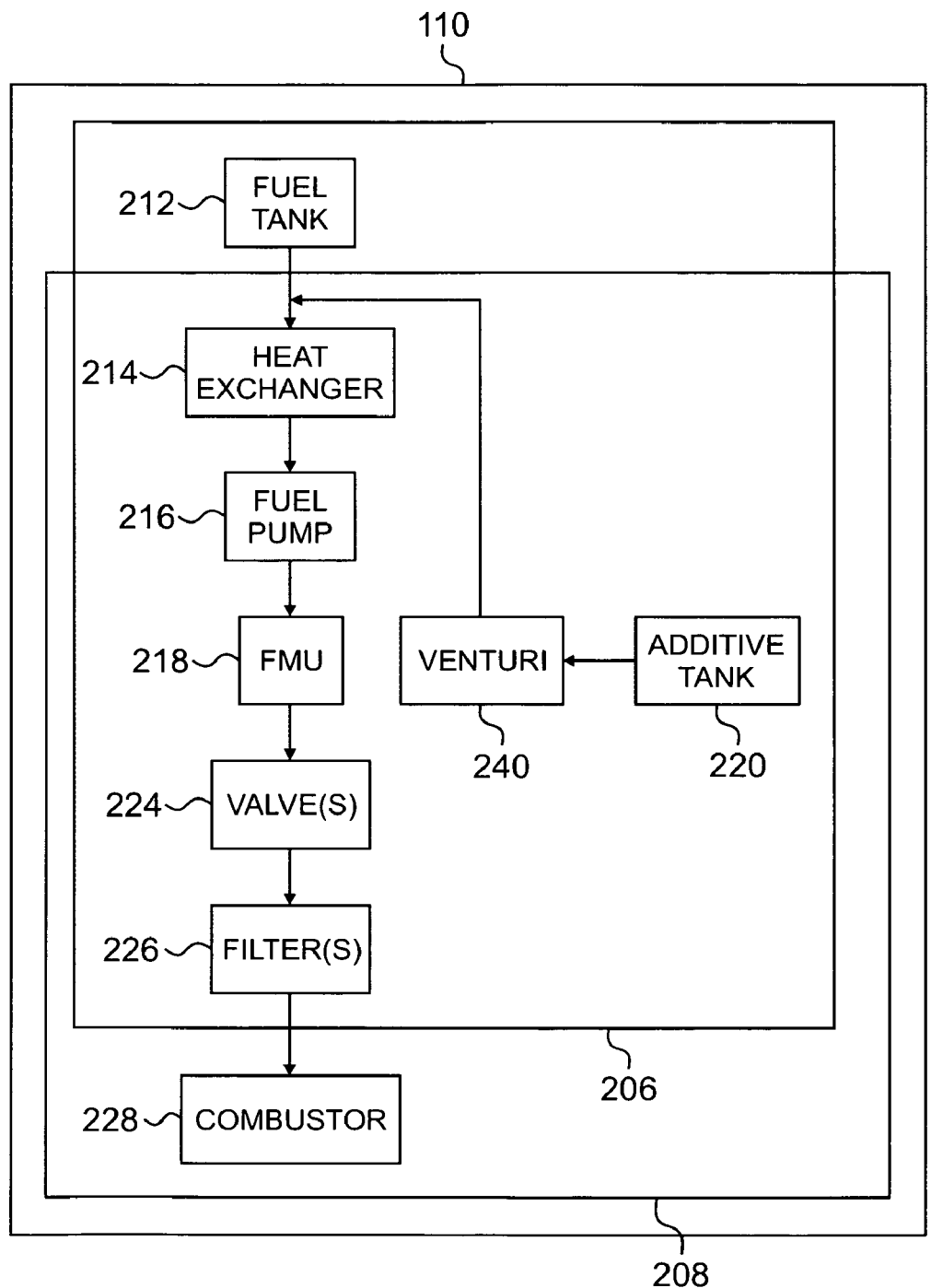
FIG. 3 is a block diagram of yet another embodiment of a fuel system according to the present invention.

FIG. 3 is a block diagram of yet another embodiment of a fuel system 206 for use with a gas turbine engine 208 of an aircraft 210. The fuel system 206 is generally similar to the fuel systems 6 and 106 described above, and includes a fuel tank 212, a heat exchanger 214 (e.g., a fuel/oil heat exchanger), a fuel pump 216, a FMU 218, an additive tank 220, one or more valves 224, and one or more filters 226. The fuel system 206 delivers a fuel and additive mixture to a combustor 228 of the gas turbine engine 208. However, in the embodiment illustrated in FIG. 3, the additive is delivered from the additive tank 220 to mix with the fuel at or near the heat exchanger 214 by way of a venturi 240, which can be of a known configuration. Any number of venturis can be provided as desired in alternative embodiments. The venturi 240 allows essentially passive mixing of the additive with the fuel as a function of flow of the fuel produced by the fuel pump 216.

Those of ordinary skill in the art will appreciate that the present invention provides numerous benefits and advantages. For example, in addition to the benefits and advantages discussed above, the present invention can help aircraft fuel systems achieve operating temperatures of at least approximately 135° C. (275° F.) while also helping to provide approximately 20,000 or more operating hour overhaul limits. A fuel system according to the present invention helps reduce undesirable coking, and can help permit fuel system operating temperatures that would otherwise generate an unacceptable level of carbonaceous deposits. Moreover, the present invention can help enable the use of relatively small and light heat exchangers.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A gas turbine engine fuel system comprising:
   a fuel tank on an aircraft for storing fuel;
   a heat exchanger through which the fuel from the fuel tank can pass;
   a fuel pump located downstream from the heat exchanger for pumping the fuel;
   a fuel metering unit for metering the fuel pumped by the fuel pump;
   an additive tank on the aircraft for storing a fuel additive, wherein the fuel additive comprises a fuel stabilizer for reducing fuel coking;
   an additive delivery subsystem for mixing the fuel additive with the fuel at or before the heat exchanger at a location on the aircraft downstream from the fuel tank to generate a fuel and fuel additive mixture; and
   a combustor located downstream of the fuel metering unit where the fuel and fuel additive mixture is delivered for combustion.

2. The system of claim 1 and further comprising:
   a first recirculation line for recirculating at least a portion of the fuel and fuel additive mixture to a location upstream of the fuel pump; and
   a second recirculation line for recirculating at least a portion of the fuel additive to an upstream location.

3. The system of claim 1, wherein the additive delivery subsystem comprises a venturi.

4. The system of claim 1, wherein the additive delivery subsystem comprises a positive displacement additive pump.

5. The system of claim 4, wherein a drive shaft is operably connected between the positive displacement additive pump and the fuel pump such that the positive displacement additive pump and the fuel pump are rotationally driven together.

6. The system of claim 4, wherein the positive displacement additive pump is electrically driven.

7. The system of claim 1, wherein the fuel additive comprises a fuel stabilizer that reduces coking to allow an operating temperature of the fuel and fuel additive mixture of at least about 135° C. (275° F.).

8. The system of claim 1, wherein the fuel additive comprises a fuel stabilizer that increases an operating temperature of fuel and fuel additive mixture over an operating temperature of the fuel by at least about 38° C. (100° F.).

9. The system of claim 1, wherein the fuel is selected from the group consisting of JP-8, Jet A and Jet A-1.

10. A method of fuel delivery for a gas turbine engine, the method comprising:
 providing jet fuel on an aircraft;
 transferring thermal energy to the jet fuel from oil using a fuel/oil heat exchanger;
 pumping the jet fuel toward a combustor using a fuel pump;
 metering the jet fuel downstream of the fuel pump to control a jet fuel delivery rate;
 providing a fuel additive on the aircraft that comprises a fuel stabilizer to reduce fuel coking at elevated operating temperatures;
 mixing the fuel additive to the jet fuel at or before the heat exchanger at a location on the aircraft downstream from a jet fuel storage tank; and
 delivering a mixture of the fuel additive and the jet fuel to the combustor.

11. The method of claim 10, wherein the jet fuel is pumped with a first positive displacement pump, wherein the fuel additive is pumped with a second positive displacement pump, and wherein a common rotational input drives both the first and second positive displacement pumps.

12. The method of claim 10, wherein the fuel additive is pumped with a positive displacement pump, the method further comprising:
 providing electricity to power the positive displacement pump.

13. The method of claim 10 and further comprising:
 recirculating at least a portion of the fuel additive to control a ratio of the fuel additive to the jet fuel;
 recirculating at least a portion of the mixture of the fuel additive and the jet fuel to control dosage.

14. An aircraft fuel system comprising:
 a fuel tank on the aircraft for storing fuel;
 a fuel/oil heat exchanger through which the fuel from the fuel tank can pass, wherein the fuel/oil heat exchanger is configured to transfer thermal energy from oil to the fuel;
 a positive displacement fuel pump located downstream from the heat exchanger for pumping the fuel;
 a fuel metering unit for metering the fuel pumped by the fuel pump;
 an additive tank on the aircraft for storing a fuel additive, wherein the fuel additive comprises a fuel stabilizer for reducing fuel coking at elevated operating temperatures;
 an additive delivery subsystem for mixing the fuel additive with the fuel at or before the heat exchanger and downstream from the fuel tank to generate a fuel and fuel additive mixture; and
 a combustor located downstream of the fuel metering unit where the fuel and fuel additive mixture is delivered for combustion.

15. The system of claim 14 and further comprising:
 a first recirculation line for recirculating at least a portion of the fuel and fuel additive mixture to a location upstream of the positive displacement fuel pump; and
 a second recirculation line for recirculating at least a portion of the fuel additive to an upstream location.

16. The system of claim 14, wherein the additive delivery subsystem comprises a venturi.

17. The system of claim 14, wherein the additive delivery subsystem comprises a positive displacement additive pump.

18. The system of claim 17, wherein a drive shaft is operably connected between the positive displacement additive pump and the positive displacement fuel pump such that the positive displacement additive pump and the positive displacement fuel pump are rotationally driven together.

19. The system of claim 17, wherein the positive displacement additive pump is electrically driven.

20. The system of claim 1, wherein the fuel additive comprises a fuel stabilizer that reduces coking to allow an operating temperature of the fuel and fuel additive mixture of at least about 135° C. (275° F.).

\* \* \* \* \*

UNITED STATES PATENT AND TRADEMARK OFFICE
CERTIFICATE OF CORRECTION

| | | |
|---|---|---|
| PATENT NO. | : 8,234,870 B2 | Page 1 of 1 |
| APPLICATION NO. | : 12/386397 | |
| DATED | : August 7, 2012 | |
| INVENTOR(S) | : Marc E. Gage | |

It is certified that error appears in the above-identified patent and that said Letters Patent is hereby corrected as shown below:

Col. 3, Line 39
  Delete "144"
  Insert --114--

Signed and Sealed this
Second Day of October, 2012

David J. Kappos
*Director of the United States Patent and Trademark Office*